United States Patent
Kaneno et al.

(10) Patent No.: US 9,833,773 B2
(45) Date of Patent: Dec. 5, 2017

(54) HYDROGEN PRODUCTION CATALYST CONTAINING $Ni_3Si$-BASED INTERMETALLIC COMPOUND, METHOD FOR ACTIVATING THE CATALYST, AND HYDROGEN PRODUCTION METHOD AND DEVICE USING THE CATALYST

(75) Inventors: Yasuyuki Kaneno, Sakai (JP); Takayuki Takasugi, Sakai (JP)

(73) Assignee: OSAKA PREFECTURE UNIVERSITY PUBLIC CORPORATION, Osaka (JP)

( * ) Notice: Subject to any disclaimer, the term of this patent is extended or adjusted under 35 U.S.C. 154(b) by 76 days.

(21) Appl. No.: 14/001,696

(22) PCT Filed: Mar. 8, 2012

(86) PCT No.: PCT/JP2012/055984
§ 371 (c)(1),
(2), (4) Date: Aug. 27, 2013

(87) PCT Pub. No.: WO2012/124605
PCT Pub. Date: Sep. 20, 2012

(65) Prior Publication Data
US 2013/0330263 A1    Dec. 12, 2013

(30) Foreign Application Priority Data
Mar. 14, 2011    (JP) .................. 2011-055626

(51) Int. Cl.
*B01J 23/755*    (2006.01)
*B01J 7/00*    (2006.01)
(Continued)

(52) U.S. Cl.
CPC ............... *B01J 23/755* (2013.01); *B01J 7/00* (2013.01); *B01J 35/04* (2013.01); *B01J 37/0081* (2013.01);
(Continued)

(58) Field of Classification Search
CPC ....................................................... B01J 23/755
See application file for complete search history.

(56) References Cited

U.S. PATENT DOCUMENTS 4,507,401 A * 3/1985 Dubois et al. ................. 502/242
4,612,407 A * 9/1986 Dubois .................... B01J 23/40
585/419

FOREIGN PATENT DOCUMENTS

JP    54-125195 A    9/1979
JP    62-183542 U    11/1987
(Continued)

OTHER PUBLICATIONS

Machine translation of JP2009-028583, pp. 1-21, Feb. 2009.*
(Continued)

*Primary Examiner* — Douglas B Call
(74) *Attorney, Agent, or Firm* — Birch, Stewart, Kolasch & Birch, LLP

(57) ABSTRACT

A catalyst according to the present invention exhibits a catalytic action to a methanol decomposition reaction or a hydrocarbon steam-reforming reaction in a short time. The present invention provides a catalyst for producing hydrogen gas, using an $Ni_3Si$-based intermetallic compound.

10 Claims, 9 Drawing Sheets

(51) Int. Cl.
*C01B 3/40* (2006.01)
*B01J 35/04* (2006.01)
*C01B 3/22* (2006.01)
*C22C 19/03* (2006.01)
*C22F 1/10* (2006.01)
*B01J 37/08* (2006.01)
*B01J 37/00* (2006.01)
*C22C 1/02* (2006.01)

(52) U.S. Cl.
CPC ............. *B01J 37/08* (2013.01); *C01B 3/22* (2013.01); *C01B 3/40* (2013.01); *C22C 1/02* (2013.01); *C22C 19/03* (2013.01); *C22F 1/10* (2013.01); *C01B 2203/0233* (2013.01); *C01B 2203/0277* (2013.01); *C01B 2203/04* (2013.01); *C01B 2203/1041* (2013.01); *C01B 2203/1058* (2013.01); *C01B 2203/1223* (2013.01); *C01B 2203/1241* (2013.01); *Y02P 20/52* (2015.11)

(56) References Cited

FOREIGN PATENT DOCUMENTS

| JP | 2007-75799 A | | 3/2007 |
|----|----|----|----|
| JP | 2009-28583 A | | 2/2009 |
| JP | 2009028583 | * | 2/2009 |

OTHER PUBLICATIONS

Microstructural Evolution during Powder Metallurgical Processing of a Ni2Si-based intermetallic Alloy S. Van Dyck et al Materials Characterization, vol. 38, pp. 1-12, 1997.*

Grain-boundary fracture and boron effect in Ni3Si alloys C.T. Liu et al. Intermetallics, vol. 4, pp. 77-83, 1996.*

A Thermodynamic Evaluation of the Nickel-Silicon System Mikael Lindholm and Bo Sundman Metallurgical and Materials Transactions A: vol. 27A, pp. 2897-2903, 1996.*

Subramanian et al., "Chemistry, Bonding and Fracture of Grain Boundaries in Ni3Si", Acta mater., vol. 45, No. 9 (1997) pp. 3565-3571.

International Search Report Issued in PCT/JP2012/055984, dated Apr. 17, 2012.

Kaneno, "Development of high temperature structural intermetallic alloys having catalytic ability for hydrogen generation", Database of Grants-in-Aid for Scientific Research, [online], May 27, 2011, Internet<URL:http://kaken.nii.ac.jp/pdf/2010/seika/jsps/24403/20560657seika.pdf>.

Liu et al., "Environmental Embrittlement and Grain-Boundary Fracture in Ni3Si", Scripta Metallurgica et Materialia, Aug. 1991, vol. 25, No. 8, pp. 1933-1937.

Lu et al., "The bonding features and environmental embrittlement of L12 intermetallic compounds", Materials Letters, Jun. 1995, vol. 24, No. 1/3, pp. 103-107.

Takasugi, "Basic Research to Develop Dual Multi-phase Intermetallic Alloys as Next-generation Type Heat Resistant Materials", Japan Society for the Promotion of Science Homepage, [online], Apr. 10, 2011, Internet <URL:http://www.jsps.go.jp/j-grantsinaid/12_kiban/hyouka23/shinchoku_gaiyo/03/summary_28_takasugi.pdf>.

* cited by examiner

[Fig. 1]
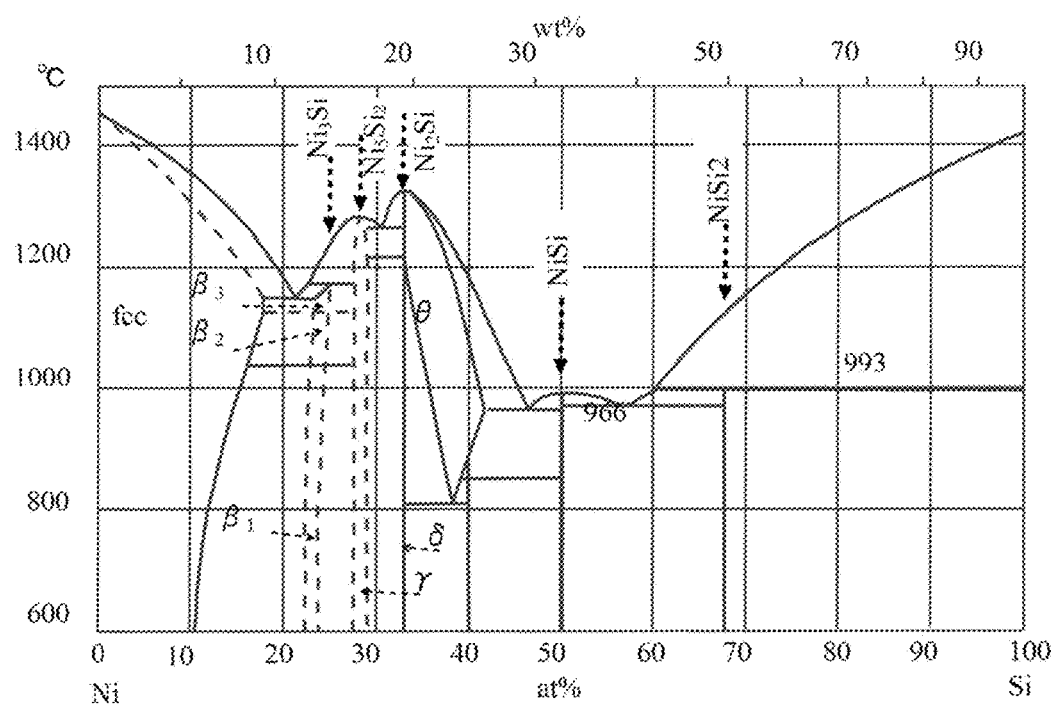

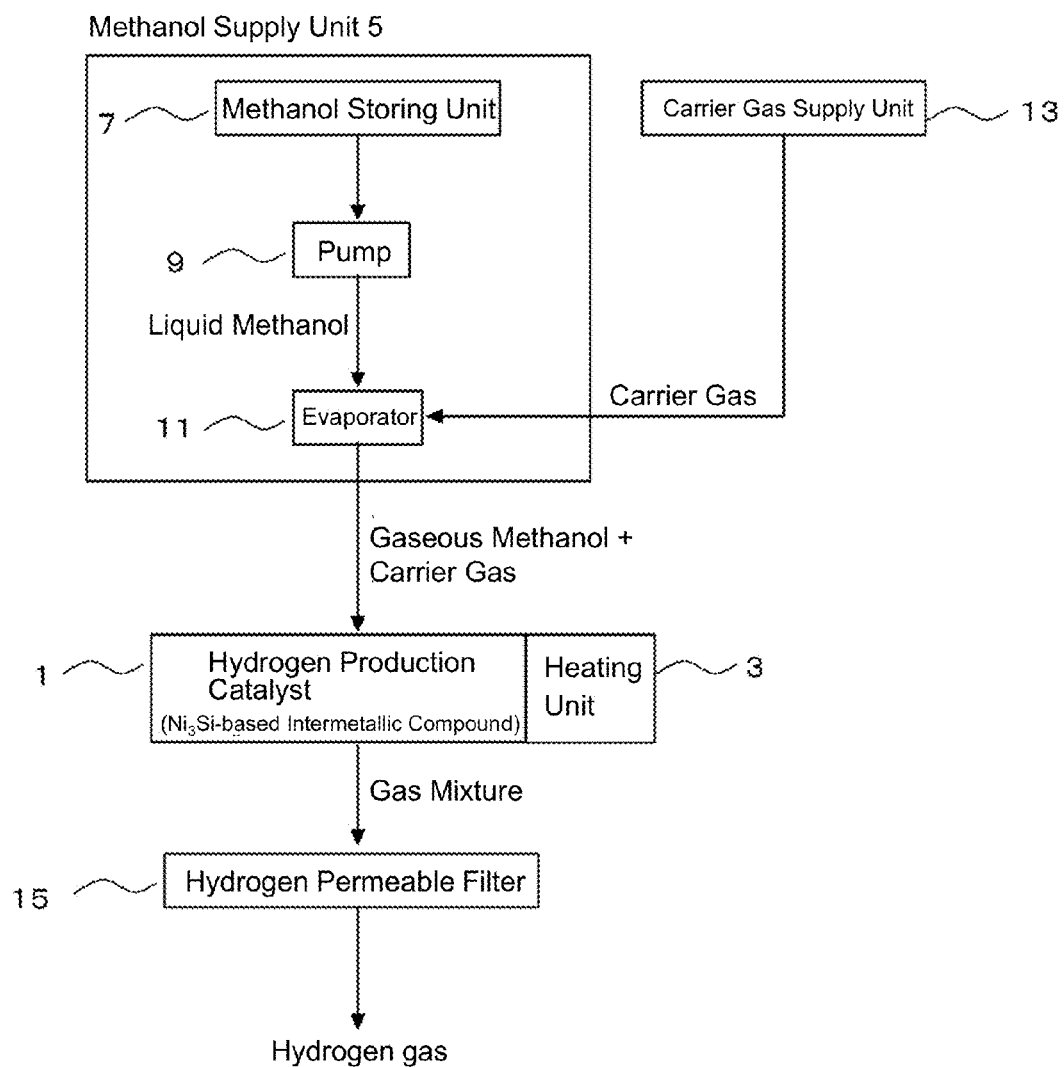
[Fig. 2]

[Fig. 3]
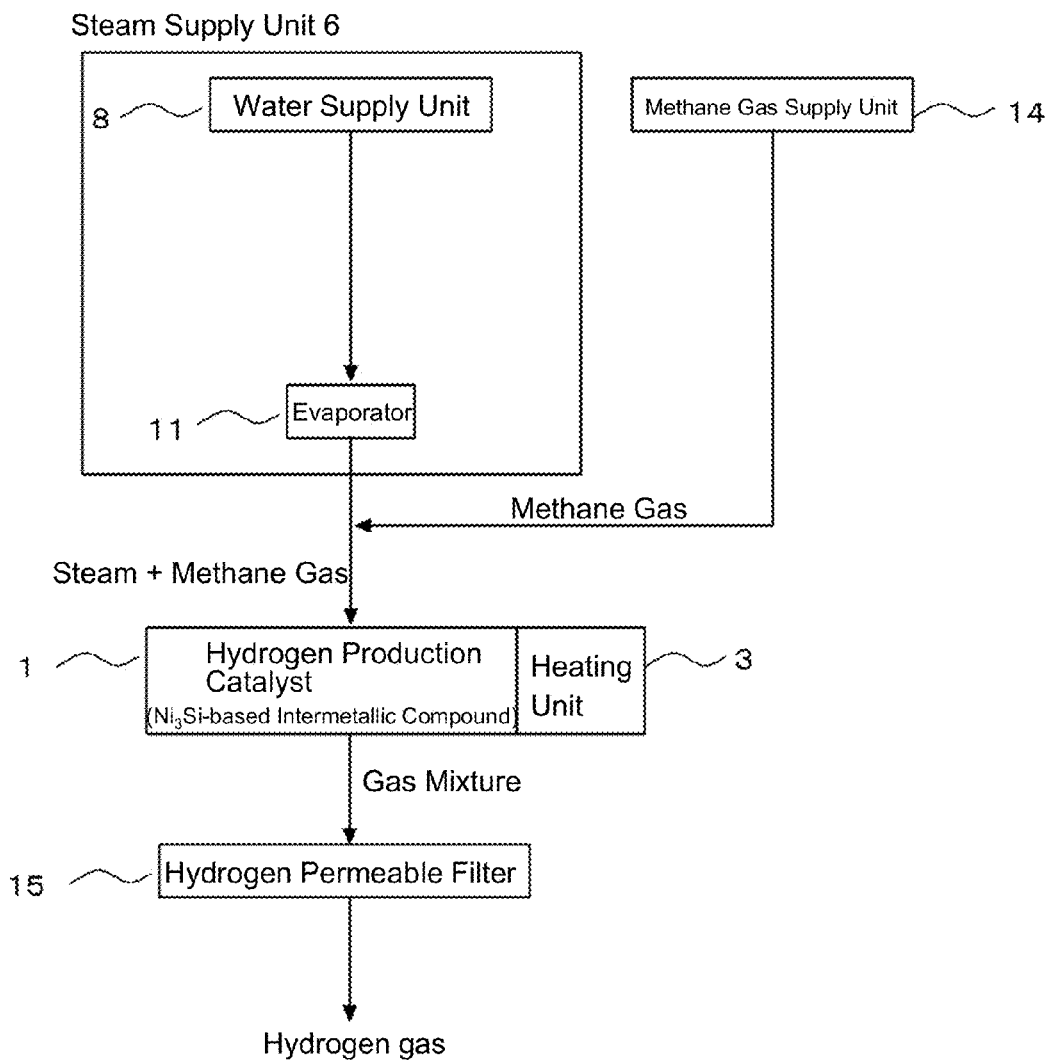
[Fig. 4]
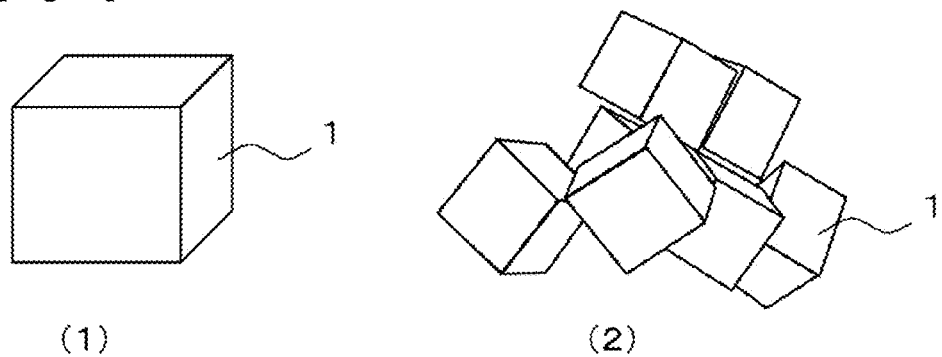
(1)          (2)

[Fig. 5]
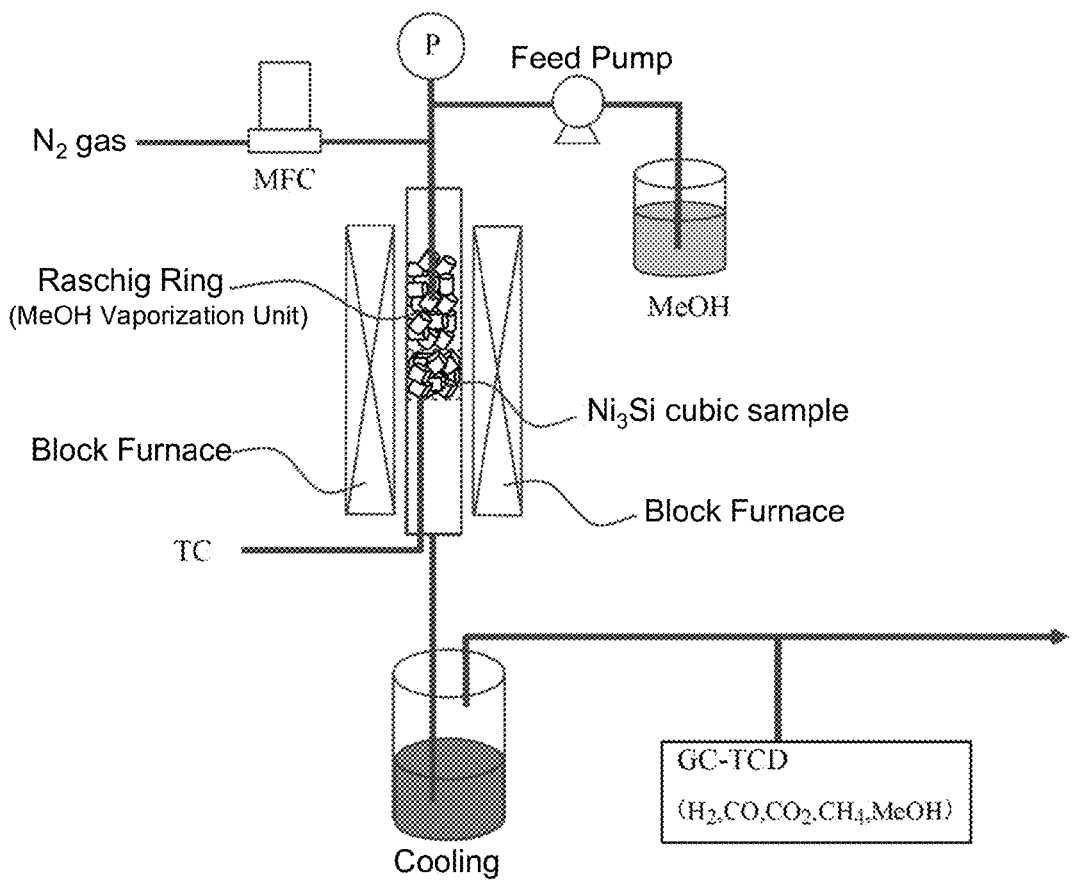

[Fig. 6]
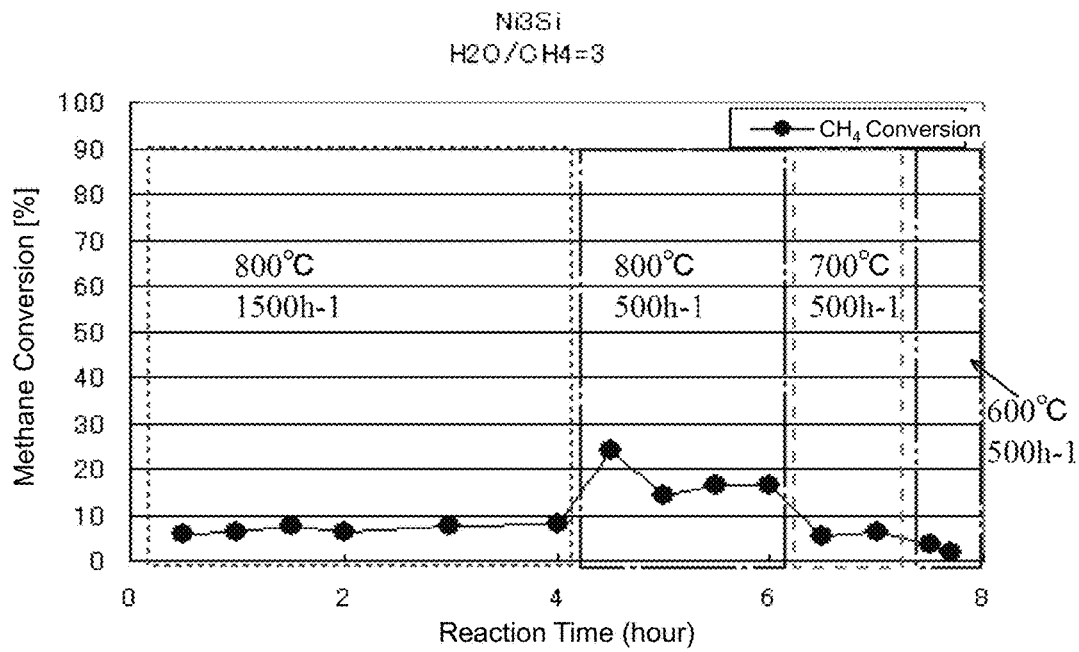
[Fig. 7]
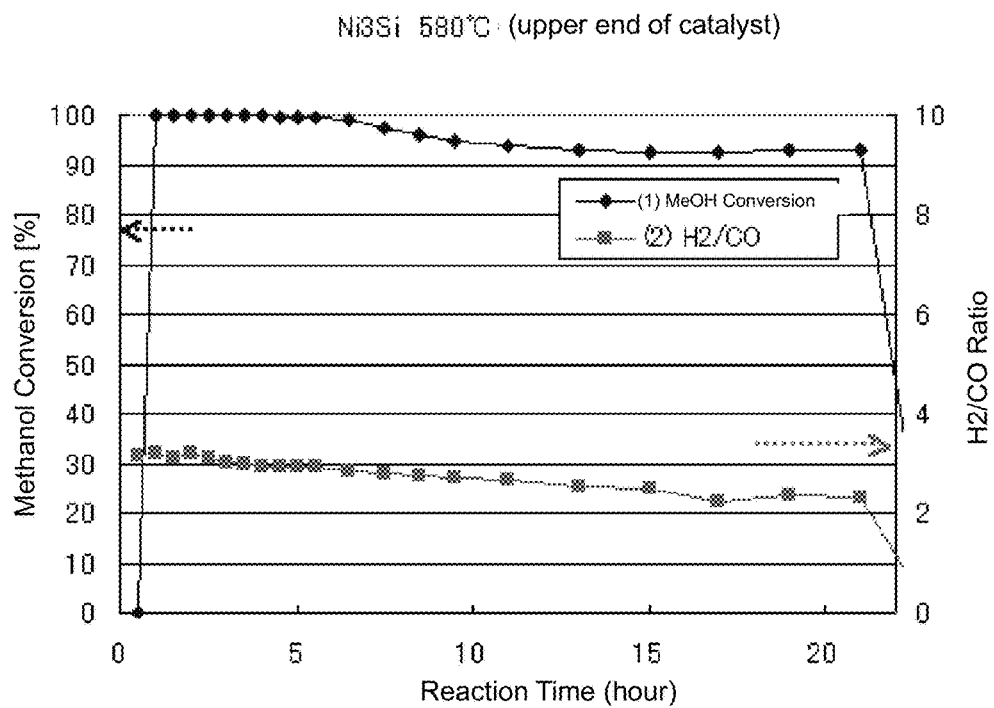

[Fig. 8]
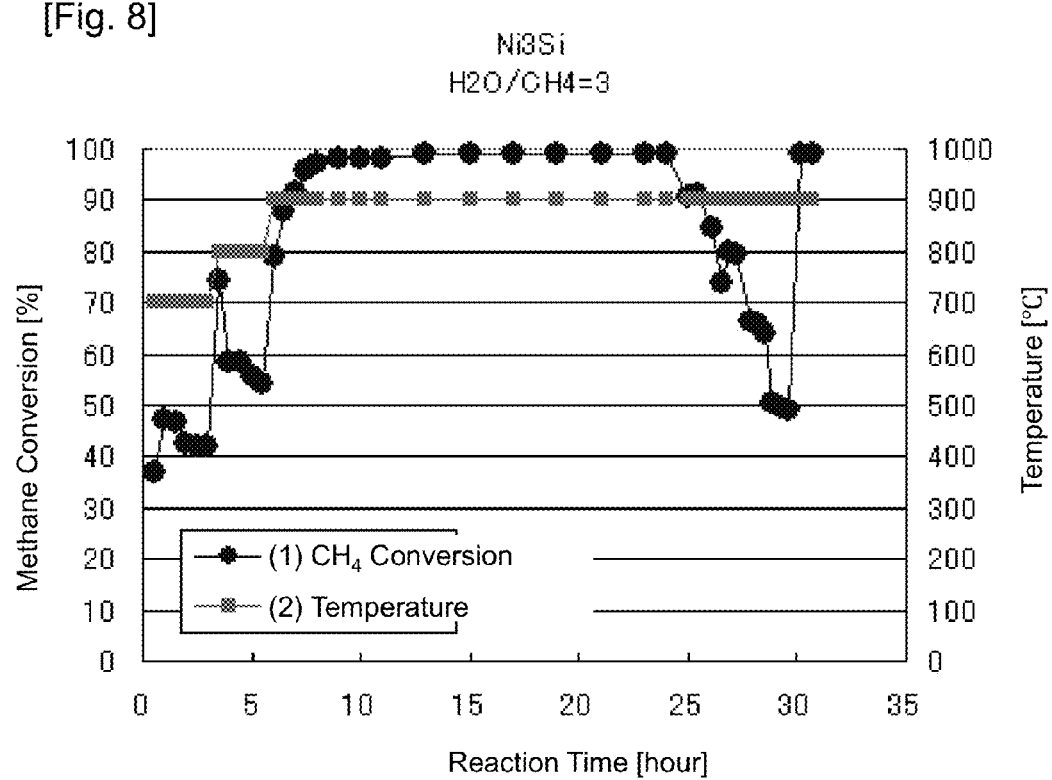

[Fig. 9]
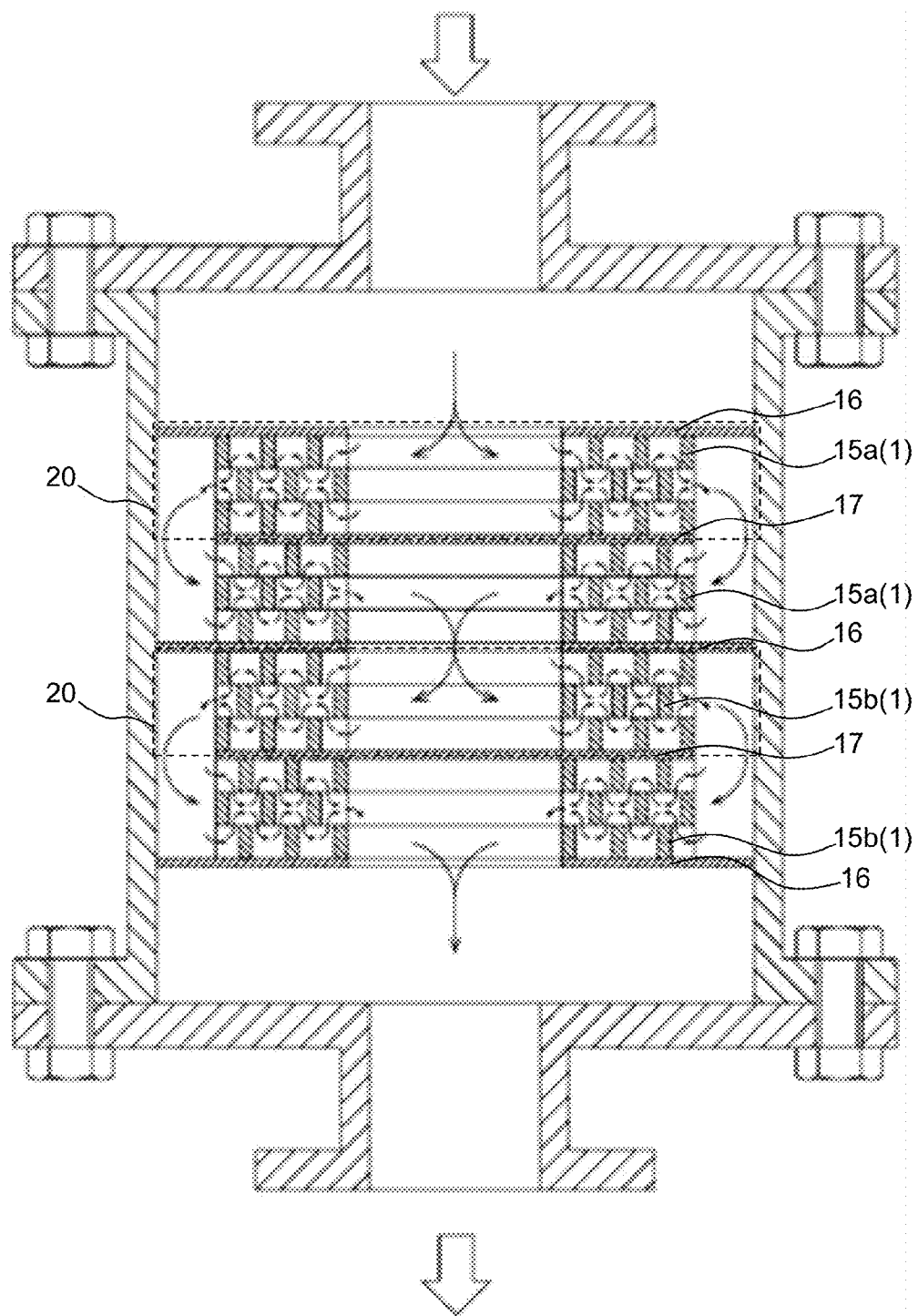

[Fig. 10]
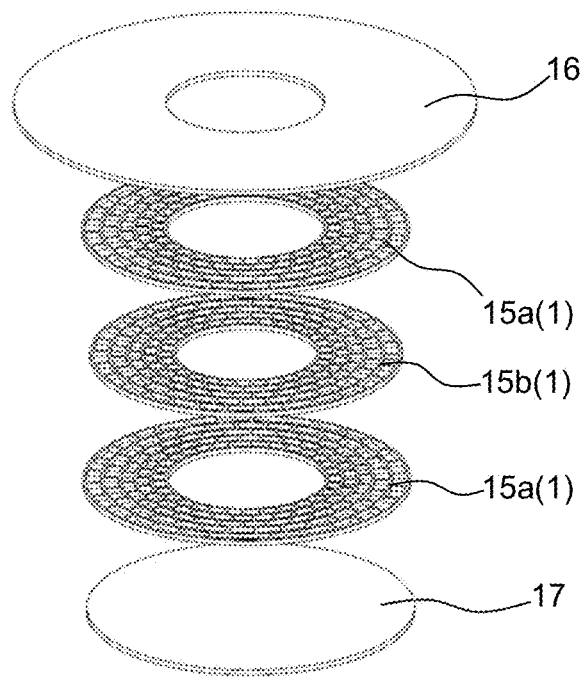
[Fig. 11]
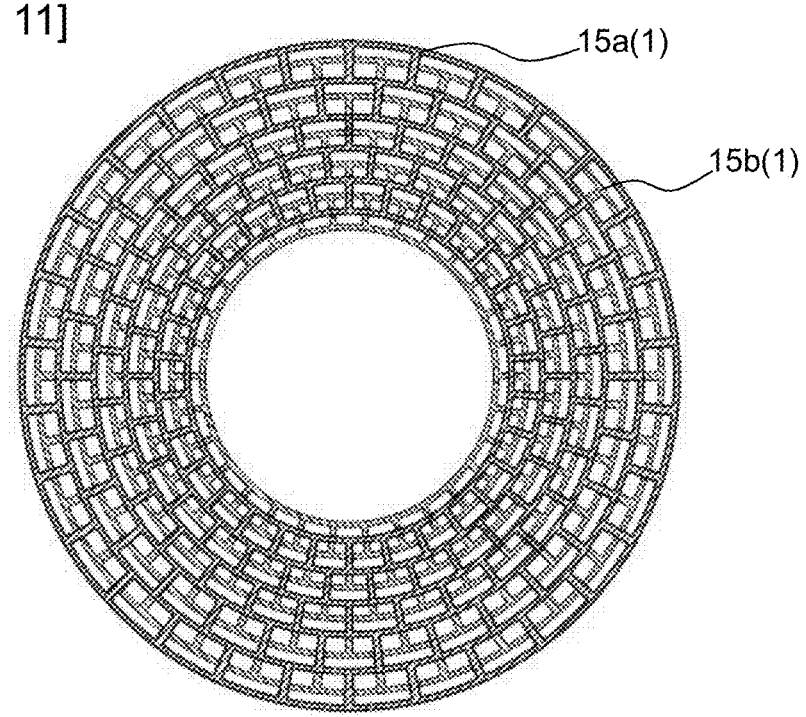

[Fig. 12]
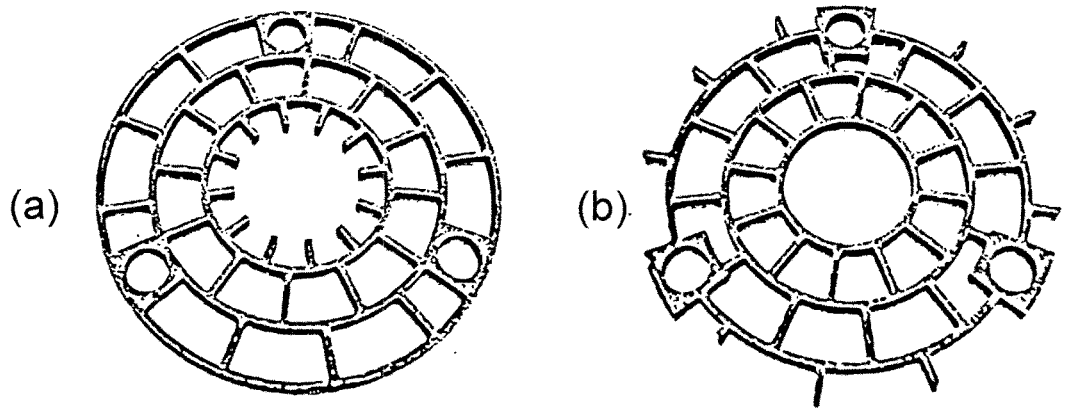
[Fig. 13]
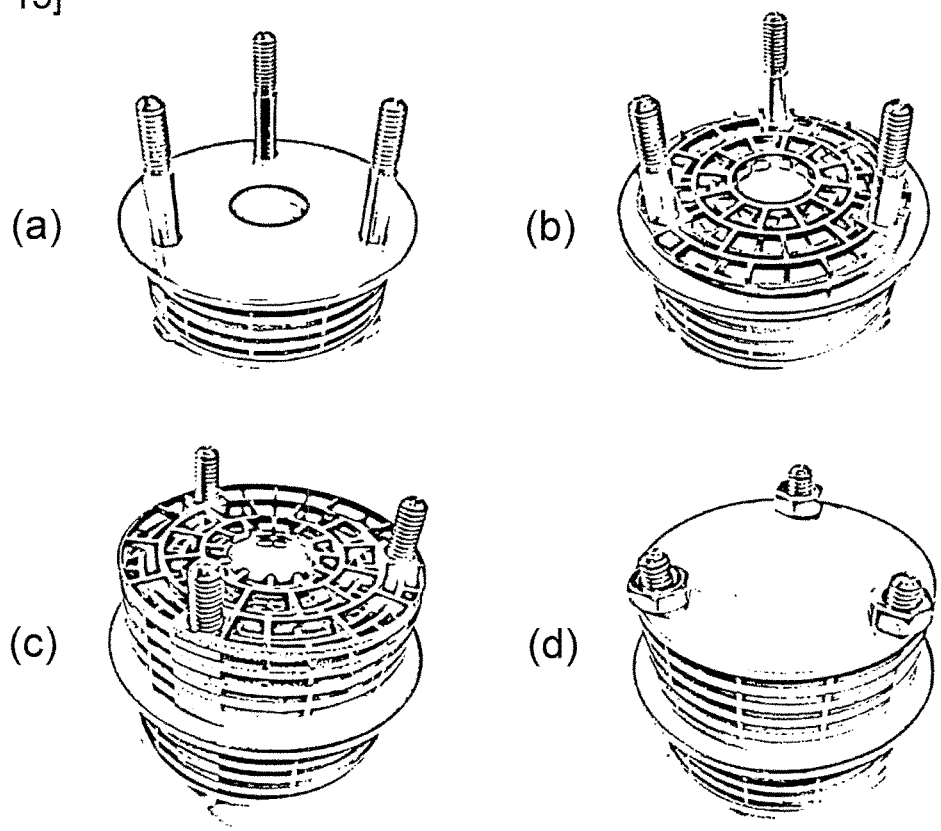

HYDROGEN PRODUCTION CATALYST CONTAINING NI₃SI-BASED INTERMETALLIC COMPOUND, METHOD FOR ACTIVATING THE CATALYST, AND HYDROGEN PRODUCTION METHOD AND DEVICE USING THE CATALYST

TECHNICAL FIELD

The present invention relates to a hydrogen production catalyst containing a Ni$_3$Si-based intermetallic compound, a method for activating the catalyst, and a hydrogen production method and device using the catalyst.

BACKGROUND

Hydrogen gas has been focused as a fuel for a fuel cell. There are various methods for producing hydrogen gas, and out of these methods, the one for producing hydrogen gas from methanol or hydrocarbon (C$_n$H$_m$) such as methane has widely been known.

The former method for producing hydrogen gas from methanol mainly utilizes a methanol decomposition reaction represented by a formula (1), and a methanol steam-reforming reaction represented by a formula (2).

$$CH_3OH \rightarrow 2H_2 + CO \quad (1)$$

$$CH_3OH + H_2O \rightarrow 3H_2 + CO_2 \quad (2)$$

The latter method of producing hydrogen gas from hydrocarbon (C$_n$H$_m$) utilizes the hydrocarbon steam-reforming reaction. The hydrocarbon steam-reforming reaction represented by a formula (3) is a reaction between hydrocarbon and steam.

$$C_nH_m + nH_2O \rightarrow nCO + (n+m/2)H_2 \quad (3)$$

The methods of producing hydrogen gas described above use a catalyst carrying a metal powder such as platinum (Pt), copper (Cu), or nickel (Ni) on a carrier such as alumina. However, in the methanol decomposition reaction reacting at a temperature of about 250° C. or higher, a hydrogen production device using this carrier has low load responsiveness, since the alumina carrier has low thermal conductivity. Therefore, a heat-resistant catalyst having excellent thermal conductivity has been demanded.

Under the background described above, it has been shown that Ni$_3$Al that is an intermetallic compound exhibits a catalyst activity to the methanol decomposition reaction, and based upon this finding, a hydrogen catalyst made of a Ni$_3$Al foil has been proposed (see, for example, Patent Document 1). It has also been reported that a Ni$_3$(Si, Ti) intermetallic compound having high strength at high temperature exhibits a catalytic action, and this intermetallic compound exhibits high conversion efficiency to hydrogen gas (see, for example, Patent Document 2).

CITATION LIST

Patent Document

Patent Document 1: JP-A No. 2007-75799
Patent Document 2: JP-A No. 2009-28583

DISCLOSURE OF THE INVENTION

Problems to be Solved by the Invention

However, the conventional hydrogen production catalyst has room for improvement in its catalytic action. For example, a catalyst having high catalyst activity to the methanol decomposition reaction or the hydrocarbon steam-reforming reaction has been demanded.

The present invention is made in view of the circumstance described above, and provides a catalyst having excellent thermal load responsiveness to a methanol decomposition reaction or a hydrocarbon steam-reforming reaction, and exhibiting high activity.

Means for Solving the Problems

The present invention provides a hydrogen production catalyst comprising a Ni$_3$Si-based intermetallic compound (including a Ni$_3$Si intermetallic compound).

EFFECT OF THE INVENTION

As a result of their extensive research, the present inventors have found that the Ni$_3$Si-based intermetallic compound exhibits a catalytic action not only to the methanol decomposition reaction but also to the hydrocarbon steam-reforming reaction. Particularly, the inventors have found that the Ni$_3$Si-based intermetallic compound having the above-described composition exhibits a high catalyst activity in the methanol decomposition reaction. The present inventors have also found that, when the Ni$_3$Si-based intermetallic compound is brought into contact with gaseous methanol at high temperature, an activity to the hydrocarbon steam-reforming reaction is strengthened, that is, the Ni$_3$Si-based intermetallic compound exhibits a high catalyst activity in the hydrocarbon steam-reforming reaction.

As described above, the catalyst according to the present invention exhibits a catalytic action to the methanol decomposition reaction or the hydrocarbon steam-reforming reaction.

The Ni$_3$Si-based intermetallic compound performing as the hydrogen production catalyst according to the present invention has higher thermal conductivity than alumina used as a carrier of a catalyst used for producing hydrogen gas from hydrocarbon gas. Therefore, the hydrogen production catalyst according to the present invention has quick starting property and excellent load responsiveness.

The Ni$_3$Si-based intermetallic compound performing as the hydrogen production catalyst according to the present invention has high strength as an alloy, and can freely be designed to have any shape by a metal working process. Therefore, the hydrogen production catalyst according to the present invention can be formed in various shapes according to a reaction device.

The Ni$_3$Si-based intermetallic compound performing as the hydrogen production catalyst according to the present invention has a catalyst activity to both the methanol decomposition reaction and the hydrocarbon steam-reforming reaction, and can be used for both reactions.

In the present specification, "~" means that numerical values before and after "~" are included in the range.

BRIEF DESCRIPTION OF THE DRAWINGS

FIG. 1 is a binary phase diagram of Ni—Si for describing a Ni$_3$Si-based intermetallic compound performing as a catalyst according to the present invention.

FIG. 2 is a conceptual view for describing a configuration of a hydrogen production device according to one embodiment of the present invention.

FIG. 3 is a conceptual view for describing a configuration of a hydrogen production device according to another embodiment of the present invention.

FIG. 4 is a conceptual view illustrating a shape of a catalyst of a $Ni_3Si$-based intermetallic compound produced in an effect demonstration experiment 1, wherein (1) illustrates a shape of the produced catalyst, and (2) illustrates a (random) arrangement of the catalyst in a reaction tube.

FIG. 5 is a diagram illustrating a configuration of a fixed-bed tubular flow catalyst reactor used in a methanol decomposition test.

FIG. 6 is a graph illustrating a result of a methane steam-reforming test, and illustrating a relationship between a reaction time and a methane conversion.

FIG. 7 is a graph illustrating a result of a methanol decomposition test, and illustrating a relationship among a reaction time, a methanol conversion, and $H_2/CO$ ratio.

FIG. 8 is a graph illustrating a result of a methane steam-reforming test using a catalyst that was used for the methanol decomposition test, and illustrating a relationship between a reaction time and a methane conversion.

FIG. 9 is a schematic cross-sectional view illustrating a catalyst structure used in an effect demonstration experiment 2.

FIG. 10 is a disassembled view of a stacking unit equipped in the catalyst structure used in the effect demonstration experiment 2.

FIG. 11 is a schematic view of plural stacked disk-like members, equipped in the catalyst structure used in the effect demonstration experiment 2, as viewed from the stacking direction.

FIG. 12(a) is a photograph of a produced first disk-like member, and (b) is a photograph of a produced second disk-like member.

FIG. 13 is a photograph for describing an assembly process of the catalyst structure used in the effect demonstration experiment 2.

PREFERRED EMBODIMENTS OF THE INVENTION (Configuration of catalyst)

A hydrogen production catalyst according to the present invention contains a $Ni_3Si$-based intermetallic compound. The $Ni_3Si$-based intermetallic compound performing as the catalyst will be described from the viewpoint of a composition. The $Ni_3Si$-based intermetallic compound preferably contains 0~500 ppm by weight of B with respect to the total weight of the composition containing 10.0~28.0 at. % of Si with the balance Ni and inevitable impurities, and more preferably contains 25~500 ppm by weight of B with respect to the total weight of the composition containing 22.0~24.0 at. % of Si with the balance Ni and inevitable impurities.

Describing the $Ni_3Si$-based intermetallic compound performing as the catalyst from a viewpoint of a microstructure, the $Ni_3Si$-based intermetallic compound contains at least a $\beta_1$ phase.

The hydrogen production catalyst will be described in more detail with reference to the drawings. FIG. 1 is a binary phase diagram of Ni—Si for describing a $Ni_3Si$-based intermetallic compound performing as a catalyst according to the present invention. In FIG. 1, $\beta_1$ is a cubic structure ($L1_2$ crystal structure), and $\beta_2$ is a monoclinic crystal of $Ni_3Si$ (a crystal structure of $\beta_3$ is unclear, but $Ni_3Si$ exhibits allotropic transformation). $\gamma$ is a hexagonal crystal of $Ni_5Si_2$.

The $Ni_3Si$-based intermetallic compound according to the catalyst of the present invention has $Ni_3Si$ ($\beta_1$ phase) illustrated in FIG. 1 as an active component, and contains this component. Therefore, the $Ni_3Si$-based intermetallic compound may be an intermetallic compound containing other phases in addition to $Ni_3Si$ ($\beta_1$ phase). For example, the $Ni_3Si$-based intermetallic compound may be an intermetallic compound containing coexistent Ni solid solution phase and $Ni_3Si$ ($\beta_1$ phase), or may be an intermetallic compound containing coexistent $Ni_3Si$ ($\beta_1$ phase) and $Ni_5Si_3$ ($\gamma$ phase). The $Ni_3Si$-based intermetallic compound may naturally be an intermetallic compound containing substantially only $Ni_3Si$ ($\beta_1$ phase).

The composition and microstructure of the $Ni_3Si$-based intermetallic compound will be described. As illustrated in FIG. 1, when the $Ni_3Si$-based intermetallic compound contains any one of (1) $Ni_3Si$ ($\beta_1$ phase), (2) Ni solid solution phase and $Ni_3Si$ ($\beta_1$ phase), and (3) $Ni_3Si$ ($\beta_1$ phase) and $Ni_5Si_3$ ($\gamma$ phase) (i.e., the $Ni_3Si$-based intermetallic compound is made of at least one phase state selected from (1) to (3)), the $Ni_3Si$-based intermetallic compound contains 0~500 ppm by weight of B with respect to the total weight of the composition containing 10.0~28.0 at. % of Si with the balance Ni and inevitable impurities.

When the $Ni_3Si$-based intermetallic compound substantially contains only the $Ni_3Si$ ($\beta_1$ phase), the $Ni_3Si$-based intermetallic compound contains 0~500 ppm by weight of B with respect to the total weight of the composition containing 22.0~24.0 at. % of Si with the balance Ni and inevitable impurities.

The $Ni_3Si$-based intermetallic compound performing as the catalyst will be described below with respect to elements contained in the $Ni_3Si$-based intermetallic compound.

The content of Si is 10.0~28.0 at. %, and more preferably 22.0~24.0 at. %. Within this range, the $Ni_3Si$-based intermetallic compound contains the $Ni_3Si$ ($\beta_1$ phase) as an active component, or substantially contains only the $Ni_3Si$ ($\beta_1$ phase).

The specific content of Si is, for example, 10.0, 10.5, 11.0, 12.0, 14.0, 16.0, 18.0, 20.0, 21.0, 21.5, 22.0, 22.5, 23.0, 23.5, 24.0, 24.5, 25.0, 26.0, 27.0, 27.5, or 28.0 at. %. The Si content may take a value between any two values of the aforementioned specific values.

The content of Ni is 72.0~90.0 at. %, and more preferably 76.0~78.0 at. %. The specific content of Ni is, for example, 72.0, 72.5, 73.0, 74.0, 75.0, 75.5, 76.0, 76.5, 77.0, 77.5, 78.0, 78.5, 79.0, 80.0, 82.0, 84.0, 86.0, 88.0, 89.0, 89.5, or 90.0 at. %. The Ni content may take a value between any two values of the aforementioned specific values.

The content of Ni described above is the balance, and this content may be the content of Ni and the inevitable impurities.

The content of each element is appropriately adjusted such that the total of the contents of Si and Ni becomes 100 at. %.

The content of B is 0~500 ppm by weight, and more preferably, 25~100 ppm by weight. The specific content of B is, for example, 25, 40, 50, 60, 75, 100, 150, 200, 300, 400, or 500 ppm by weight. The content of B may take a value between any two values of the aforementioned specific values.

When the catalyst made of the $Ni_3Si$-based intermetallic compound is described with respect to its form and state, it is contained in a carrier (e.g., the powder or powder and granular material of the $Ni_3Si$-based intermetallic compound is dispersed in the other substance), for example.

When the whole catalyst is an intermetallic compound, the catalyst has high thermal conductivity, and exhibits the catalytic action in a short time (for example, it is more excellent in thermal conductivity, and thermal load responsiveness than the catalyst using a ceramic carrier). Therefore, the catalyst of the present invention is preferably made of only the $Ni_3Si$-based intermetallic compound. For example, raw metals having the composition described above are melted and solidified to form an ingot, and this ingot is cut and polished to form a plate-like catalyst or cubic catalyst containing only the $Ni_3Si$-based intermetallic compound.

(Production method of catalyst)

A production method of the hydrogen production catalyst according to the present invention will be described.

Firstly, a $Ni_3Si$-based intermetallic compound containing 0~500 ppm by weight of B with respect to the total weight of the composition containing 10.0~28.0 at. % of Si with the balance Ni and inevitable impurities is casted. Specifically, raw metals are weighed to have the composition described above, and these raw metals are melted and casted in an arc melting furnace or a vacuum induction melting furnace to form a sample made of an ingot.

Then, the sample made of the produced ingot is cut to have a desired shape. For example, the sample is processed to have a plate-like shape.

The obtained $Ni_3Si$-based intermetallic compound is etched with at least either one of acid and alkali, according to need, before used as the catalyst. When the $Ni_3Si$-based intermetallic compound is etched with at least either one of acid and alkali, an oxide film on the surface can be removed, and the surface morphology, surface area, and the composition can be controlled by the dissolution of Ni and Si. Therefore, the $Ni_3Si$-based intermetallic compound etched with at least either one of acid and alkali exhibits high catalytic action, and the etching process can activate the catalyst performance of the $Ni_3Si$-based intermetallic compound.

In the etching process, at least either one of acid and alkali is used. Therefore, the $Ni_3Si$-based intermetallic compound may be etched with only one of acid and alkali. Alternatively, the $Ni_3Si$-based intermetallic compound may be etched with acid, and then, etched with alkali.

Specifically, the $Ni_3Si$-based intermetallic compound may be etched with HCl solution and $HNO_3$ solution, or etched with NaOH solution, for example. The $Ni_3Si$-based intermetallic compound may also be etched with solution containing HCl and $HNO_3$, and further etched with NaOH solution.

For example, the etching process using the solution containing HCl and $HNO_3$ is carried out at a processing temperature of about 20° C. for a processing time (etching time) of one hour or shorter. The etching process using the NaOH solution is carried out at a processing temperature of about 10° C.~90° C. for a processing time (etching time) of one hour or longer.

The $Ni_3Si$-based intermetallic compound may be brought into contact with gaseous methanol to cause the methanol decomposition reaction, according to need, before used as the catalyst. The $Ni_3Si$-based intermetallic compound according to the present invention exhibits itself the catalytic action to the methanol decomposition reaction and the hydrocarbon steam-reforming reaction, and the $Ni_3Si$-based intermetallic compound having the composition described above exhibits the catalytic action and high catalyst activity in the methanol decomposition reaction for a short time, in particular. However, when the $Ni_3Si$-based intermetallic compound performing as the catalyst according to the present invention is brought into contact with the gaseous methanol at high temperature (e.g., 580° C.), the activity to the hydrocarbon steam-reforming reaction is enhanced, so that it exhibits the catalytic action and high catalyst efficiency in a short time in the hydrocarbon steam-reforming reaction. Therefore, the above-described process (in other words, the methanol decomposition reaction) is preferably carried out to the catalyst for the hydrocarbon (e.g., methane) steam-reforming reaction. The temperature for the hydrogen production process described above is preferably 520° C.~650° C., and the processing time thereof is 0.5 hour~48 hours (580° C. is only illustrative, and the temperature is not limited to this temperature).

The hydrogen production catalyst can be produced according to the process described above.

Subsequently, how to use the hydrogen production catalyst according to the present invention will be described. The hydrogen production catalyst according to the present invention is used for the production of hydrogen gas as described below. Hydrogen gas is produced by the methanol decomposition reaction or the hydrocarbon steam-reforming reaction. The methanol decomposition reaction is the reaction represented by the formula (1) of $CH_3OH \rightarrow 2H_2+CO$, and the hydrocarbon steam-reforming reaction is the reaction represented by the formula (3) of $C_nH_m+nH_2O \rightarrow nCO+(n+m/2)H_2$. For example, the methane steam-reforming reaction is represented by $CH_4+H_2O \rightarrow CO+3H_2$.

(Hydrogen production method by methanol decomposition reaction)

In the hydrogen production by the methanol decomposition reaction, the catalyst described above is heated to high temperature of 580° C., and the gaseous methanol is brought into contact with the heated catalyst. With this process, the methanol decomposition reaction occurs, whereby hydrogen gas can be produced from methanol.

The heating temperature of the catalyst in the methanol decomposition reaction is preferably 520° C.~650° C. (580° C. is only illustrative). Specifically, the heating temperature is 520, 540, 560, 580, 600, 620, 640, and 650° C., for example.

The gaseous methanol is obtained by heating liquid methanol. The flow rate of the liquid methanol is 0.01~1 mL/min with respect to 5 mm cube.

The gaseous methanol is preferably brought into contact with the catalyst, in a mixture with a carrier gas. The type of the carrier gas is not particularly limited, and it is preferably an inert gas such as nitrogen gas.

In the methanol decomposition reaction, hydrogen gas is obtained by the decomposition of methanol according to the reaction of $CH_3OH \rightarrow 2H_2+CO$, so that the gas obtained by the decomposition reaction is a gas mixture containing at least hydrogen gas and carbon monoxide. The method of separating hydrogen gas from the gas mixture is not particularly limited. For example, hydrogen gas can be separated by allowing the gas mixture to pass through a hydrogen permeable filter.

(Hydrogen production method by hydrocarbon steam-reforming reaction)

On the other hand, in order to produce hydrogen gas by the hydrocarbon steam-reforming reaction, the above-described catalyst is heated to a temperature of 700° C. or higher, and the gas containing hydrocarbon and steam is brought into contact with the heated catalyst. With this process, the hydrocarbon steam-reforming reaction occurs, so that hydrogen gas can be produced from hydrocarbon.

In this case, hydrocarbon is methane, for example. When methane is used, the reaction to which this catalyst is applied is the methane steam-reforming reaction. The hydrocarbon may be ethane, propane, or butane. The hydrocarbon may also be a natural gas containing these gases as a main component.

The catalyst used for the hydrocarbon steam-reforming reaction contains the $Ni_3Si$-based intermetallic compound as described above. According to need, the catalyst is etched with at least either one of acid and alkali, but preferably, the hydrogen production process in which the $Ni_3Si$-based intermetallic compound is brought into contact with the gaseous methanol is employed (for example, the process in which the $Ni_3Si$-based intermetallic compound is brought into contact with the gaseous methanol at a high temperature of 580° C. is performed). The catalyst to which this process is performed has high catalyst activity, thereby being capable of producing more hydrogen gas.

When the hydrocarbon is methane, the heating temperature of the catalyst in the hydrocarbon steam-reforming reaction is 700° C. or higher as described above, and preferably, 800~900° C. The temperature is specifically 800, 810, 820, 830, 840, 850, 860, 870, 880, 890, or 900° C., for example. The temperature may take a value between any two values of the aforementioned specific values. Since the $Ni_3Si$ ($\beta_1$ phase) that is the activity component is present under about 1040° C. or lower, the upper-limit temperature is about 1040° C. as illustrated in FIG. 1.

When the hydrocarbon is methane, the gas containing the hydrocarbon and steam is fed with the volume ratio of steam to methane of 3.0 (S/C=3.0). The space velocity (SV) is 500 h$^{-1}$, for example.

In the hydrocarbon steam-reforming reaction, hydrogen gas is produced by the methane steam-reforming reaction represented by $CH_4+H_2O \rightarrow CO+3H_2$. Therefore, the obtained gas is a gas mixture containing at least hydrogen gas and carbon monoxide, as in the methanol decomposition reaction. Accordingly, even in the hydrocarbon steam-reforming reaction, hydrogen gas is separated from the gas mixture by allowing the gas mixture to pass through a hydrogen permeable filter.

(Hydrogen production device)

Next, the hydrogen production device according to the embodiment of the present invention will be described with reference to FIGS. 2 and 3. FIG. 2 is a conceptual view for describing the configuration of the hydrogen production device according to one embodiment of the present invention, and FIG. 3 is a conceptual view for describing the configuration of the hydrogen production device according to another embodiment of the present invention.

As illustrated in FIG. 2, the hydrogen production device according to the present embodiment includes the catalyst 1 (hydrogen production catalyst ($Ni_3Si$-based intermetallic compound) 1) of the $Ni_3Si$-based intermetallic compound described above, a heating unit 3 for heating the catalyst 1, and a methanol supply unit 5 for supplying the gaseous methanol to the catalyst 1.

The configuration of the heating unit 3 is not particularly limited. For example, an aluminum block furnace can be used for the heating unit 3. The heating unit 3 is configured to heat the catalyst 1 to 580° C., for example.

The configuration of the methanol supply unit 5 is not particularly limited, so long as the methanol supply unit 5 can supply the gaseous methanol to the catalyst 1. For example, the methanol supply unit 5 includes a methanol storing unit 7 for storing the liquid methanol, a pump 9 that feeds the liquid methanol from the methanol storing unit 7, and an evaporator 11 that evaporates the liquid methanol to form the gaseous methanol. A carrier gas supply unit 13 that supplies a carrier gas carrying the gasified methanol to the catalyst 1 may be connected to the evaporator 11.

A hydrogen permeable filter 15 may be arranged on the downstream side of the catalyst 1. In this case, hydrogen gas can be separated by allowing the gas mixture, produced by the decomposition of methanol, to pass through the filter.

The hydrogen production method by the methanol decomposition reaction described above can easily be carried out by using the device described above.

In FIG. 2, the catalyst 1 is stored in a reaction tube (e.g., a stainless tube or a quartz tube).

As illustrated in FIG. 3, the hydrogen production device according to another embodiment includes the catalyst 1 (hydrogen production catalyst ($Ni_3Si$-based intermetallic compound) 1) of the $Ni_3Si$-based intermetallic compound described above, a heating unit 3 for heating the catalyst 1, a steam supply unit 6 for supplying steam to the catalyst 1, and a methane gas supply unit 14 for supplying a methane gas to the catalyst 1.

The configuration of the steam supply unit 6 is not particularly limited, so long as the steam supply unit 6 can supply steam to the catalyst 1. For example, the steam supply unit 6 includes a water supply unit 8 for supplying water, and the evaporator 11 that evaporates the supplied water to form steam. The steam supply unit 6 is connected to a reaction tube (e.g., a stainless tube or a quartz tube) storing the hydrogen production catalyst 1 together with the methane gas supply unit 14.

The other configuration of this device is the same as the device illustrated in FIG. 2. The hydrogen production method by the hydrocarbon steam-reforming reaction (in this case, the methane steam-reforming reaction) described above can easily be carried out by using the device described above.

The reaction temperature in the hydrocarbon steam-reforming reaction is different from the reaction temperature in the chemical reaction in the device illustrated in FIG. 2. Therefore, the heating unit is preferably configured to heat the catalyst to 700° C. or higher.

(Effective demonstration experiment 1)

In order to demonstrate that the hydrogen production catalyst according to the present invention has high catalyst activity, hydrogen gas was produced by performing the methane steam-reforming reaction and the methanol decomposition reaction by using the hydrogen production device according to the present invention.

Firstly, raw metals of Ni and Si (each having a purity of 99.9 weight %) and B were weighed to have the composition illustrated in Table 1, and these raw metals were melted by a vacuum induction melting (VIM) process to form a sample made of an ingot of about 8 kg.

TABLE 1

|  |  | Ni | Si | Total | B (wt. %) |
|---|---|---|---|---|---|
| Example | atomic % | 76.3 | 23.7 | 100 | 0.005 |
|  | weight % | 87.1 | 12.9 | 100 | 0.005 |

Table 1 illustrates the content in terms of both atomic % and weight % for the same example. The content of B is a weight ratio (wt. %) to the total weight of an alloy having a total of 100 at. % of Ni and Si.

The ingot had substantially the target composition as illustrated in Table 2 as a result of the analysis of the composition of the prepared ingot.

TABLE 2

| Result Of Analysis | | Ni | Si | Total | B (wt. %) |
|---|---|---|---|---|---|
| Example | weight % | Bal. | 12.86 | 100 | 0.005 |

"Bal." in the column of Ni in Table 2 indicates the balance.

The prepared ingot was cut by an electric spark forming to form a cubic sample (also referred to as a $Ni_3Si$ cubic sample) of about 5 mm (see FIG. 4(1)). The methane steam-reforming test and the methanol decomposition test were carried out by using the prepared cubic sample as a catalyst. FIG. 5 illustrates a device used for these tests. FIG. 5 is a diagram illustrating a configuration of a fixed-bed flow catalyst reactor used in the methanol decomposition test.

As illustrated in FIG. 5, in this device, $N_2$ gas is supplied to a stainless tube in a block furnace via an MFC (mass flow controller), while methanol (described as MeOH in a methanol storage container in FIG. 5) is supplied to the stainless tube via a feed pump. A Raschig ring unit (MeOH vaporization unit) and the $Ni_3Si$ cubic samples (see FIG. 4(2)) are arranged in the stainless tube, wherein methanol is vaporized by the Raschig ring unit. The vaporized methanol is decomposed due to a contact with the $Ni_3Si$ cubic samples. This device is configured such that the gas generated by the decomposition is discharged via a cooling unit.

In this device, the diameter of the stainless tube is 34 mm, and the $Ni_3Si$ cubic samples were filled in the tube with the height of 20 mm (hereinafter referred to as a filling layer, and the filling volume fraction of the filling layer is 0.56). The total flow rate of the gas was adjusted with a reference flow rate being defined as 690 ml/min (when the total flow rate of the gas is 690 ml/min, the flow rate of the catalyst per the surface area is 337 $cm^3 \cdot h^{-1} \cdot cm^{-2}$, and the space velocity (SV) is about 2270 $h^{-1}$).

As illustrated in FIG. 5, the gas generated by the decomposition was temporarily cooled in the cooling unit, and the easily condensed gas was stored in a trap. In this experiment, the condensate liquid was collected every hour or every two hours, and the methanol concentration was measured by using a gas chromatography (GC). Thus, a methanol collection amount was obtained (liquid analysis). The concentration of each of $H_2$, CO, $CO_2$, $CH_4$, and methanol was measured from the component analysis of the dried gas (the gas discharged from the cooling unit), and the selectivity of each component was calculated (gas analysis). The amount of the methanol was calculated by adding up the result of the liquid analysis and the result of the gas analysis.

FIG. 5 illustrates the configuration of the device for the methanol decomposition test. Therefore, the device includes the methanol storage container, the feed pump, the Raschig ring unit (MeOH vaporization unit), and the $N_2$ gas (carrier gas) supply unit. In the case of the methane steam-reforming test, a steam supply unit and a methane gas supply unit are connected to the stainless tube to supply steam and methane to the catalyst (the $Ni_3Si$ cubic sample in FIG. 5) in the stainless tube.

In FIG. 5, "P" indicates a pressure gauge, "MFC" indicates a mass flow controller, "TC" indicates a thermocouple, and "GC-TCD" indicates a gas chromatography.

(1) Methane steam-reforming test (experiment using catalyst after etching process)

Firstly, the $Ni_3Si$ cubic sample was etched. The etching process was carried out in the procedure described below.

(i) Acid etching was carried out (the sample was dipped for 20 minutes in a solution containing HCl and $HNO_3$ in a volume ratio of 3:1).

(ii) After washed with water, the sample was washed with ethanol, and dried with hot air.

(iii) Alkali etching was carried out (the sample was dipped for 5 hours at 80° C. in a NaOH solution (diluted with distilled water) of 20 wt. %).

(iv) After washed with water, the sample was washed with ethanol, and dried with hot air.

Then, the etched $Ni_3Si$ cubic sample was arranged in the stainless tube, and a reduction process was carried out for 1 hour at 600° C. ($H_2$ and $N_2$ with the $H_2$ concentration of 85 vol. % were flowed), and then, the steam-reforming test of methane was carried out.

The conditions for the steam-reforming test of methane were set as described below.

S/C=3.0 (i.e., $H_2O/CH_4$=3.0 in terms of volume ratio)
SV (space velocity)=1500 $h^{-1}$ (0.0≤t≤4.0 hours) or 500 $h^{-1}$ (4.0≤t≤7.7 hours)
Temperature: 800° C. (0.0≤t≤6.0 hours), 700° C. (6.0<t≤7.0 hours), 600° C. (7.0<t≤7.7 hours),
Catalyst filling amount: 17.6 ml
Gas flow rate (1500 $h^{-1}$): $CH_4$=440 Nml/min, $H_2O$=1319 Nml/min
Arrangement of catalyst: the etched catalyst was randomly arranged in the reaction tube The SV and the temperature were set as 800° C. and 1500 $h^{-1}$ during the reaction time of 0~4 hours, as 800° C. and 500 $h^{-1}$ during the reaction time after 4 hours till 6 hours, as 700° C. and 500 $h^{-1}$ during the reaction time after 6 hours till 7 hours and as 600° C. and 500 $h^{-1}$ during the reaction time after 7 hours till 8 hours. As described above, the SV and the temperature were adjusted with time.

The composition of the gas discharged from the stainless tube was measured by using the gas chromatography.

FIG. 6 illustrates the result. FIG. 6 is a graph illustrating the result of the steam-reforming test of methane, and illustrating a relationship between the reaction time and a methane conversion.

In FIG. 6, an area enclosed by a dotted line indicates a measurement point where the temperature and the SV are 800° C. and 1500 $h^{-1}$, an area enclosed by a chain line indicates a measurement point where the temperature and the SV are 800° C. and 500 $h^{-1}$, an area enclosed by a broken line indicates a measurement point where the temperature and the SV are 700° C. and 500 $h^{-1}$, and an area enclosed by a two-dot chain line indicates a measurement point where the temperature and the SV are 600° C. and 500 $h^{-1}$.

As illustrated in FIG. 6, it is found that the $Ni_3Si$ exhibits the catalyst activity to the methane steam-reforming reaction. Specifically, the methane conversion is low in the case of SV=1500 $h^{-1}$ (5.6~7.9% in 0.5~4 hours), but when the SV is lowered to 500 $h^{-1}$, the methane conversion increases up to 16% (24.2% in 4.5 hours, and 16.5% in 5.5 hours or 6 hours). This shows that the methane conversion is reduced with the decrease in the temperature. The $Ni_3Si$ cubic sample has sensitivity to the SV, and its methane conversion is different depending upon the temperature. Therefore, it is assumed that the $Ni_3Si$ cubic sample has the catalyst activity to the methane steam-reforming reaction.

(2) Methanol decomposition test (test using catalyst after etching process)

The methanol decomposition test was carried out by using the prepared $Ni_3Si$ cubic sample. As in the steam-reforming test of methane, the $Ni_3Si$ cubic sample was etched, and the etched $Ni_3Si$ cubic sample was used. The conditions for the etching process were the same as those described in the steam-reforming test of methane.

Firstly, the etched $Ni_3Si$ cubic sample was arranged in the stainless tube, and heated to 600° C. With this state, the reduction process was performed to the surface of the $Ni_3Si$ cubic sample by flowing hydrogen gas with a hydrogen concentration of 85 vol. % for 1 hour.

Then, the supply of hydrogen gas was stopped, and the temperature was adjusted in order that the temperature of the $Ni_3Si$ cubic samples on the upper end of the stainless tube was 580° C. Thereafter, only nitrogen gas was flowed for 30 minutes with a flow rate of 30 ml/min to replace hydrogen gas in the reaction tube by nitrogen gas.

Next, the liquid methanol was supplied to the Raschig ring unit (MeOH vaporization unit) in the stainless tube from the methanol storage container by use of the pump, and the liquid methanol was vaporized in the Raschig ring unit to form a gaseous methanol. The gaseous methanol was brought into contact with the $Ni_3Si$ cubic sample in the stainless tube together with nitrogen gas (serving as a carrier gas) (see FIG. 5). As described above, the composition of the gas discharged from the stainless tube was measured by using the gas chromatography. The measurement was carried out every 0.5 hour.

FIG. 7 illustrates the result. FIG. 7 is a graph illustrating the result of the methanol decomposition test, and illustrating a relationship among the reaction time, the methanol conversion, and $H_2/CO$ ratio. In FIG. 7, the methanol conversion is indicated by a diamond mark ("(1) MeOH conversion" in FIG. 7), while the $H_2/CO$ ratio is indicated by a rectangular mark ("(2) $H_2/CO$" in FIG. 7). As indicated by an arrow in FIG. 7, a left axis is the methanol conversion, and a right axis is the $H_2/CO$ ratio.

It is found from FIG. 7 that the $Ni_3Si$ exhibits high catalyst activity to the methanol decomposition reaction, and its catalyst activity is very high. The methanol conversion of 100% was attained one hour after the start of the methanol decomposition reaction, which shows that the $Ni_3Si$ exhibits high catalyst efficiency in a short time. The $Ni_3Si$ exhibits the methanol conversion of 92.3~100% until the test was ended after a lapse of 21 hours, and the methanol decomposition reaction was stably carried out. It is found from this test that the $Ni_3Si$ exhibits high activity to the methanol decomposition test.

(3) Methane steam-reforming test (test using catalyst which was used for methanol decomposition test)

The methane steam-reforming test was carried out by using the $Ni_3Si$ cubic sample which was used for the methanol decomposition test. Specifically, the test in (2) was made as a pretreatment for the $Ni_3Si$ cubic sample, and the methane steam-reforming test was carried out by using this $Ni_3Si$ cubic sample.

The conditions for the methanol decomposition test were set as the same as those in the "methanol decomposition test (test using catalyst after etching process)" in (2), and the conditions for the methane steam-reforming test were set as almost the same as those in the "methane steam-reforming test (test using catalyst after etching process)" in (1), except that the test was carried out not after the etching process but after the methanol decomposition test. The conditions for the methane steam-reforming test will be described below.

S/C=3.0 (i.e., $H_2O/CH_4$=3.0 in terms of volume ratio).
SV (space velocity)=500 $h^{-1}$ (0.0≤t≤24.0 hours), 1500 $h^{-1}$ (24.0<t≤25.5 hours), 2000 $h^{-1}$ (25.5<t≤27.2 hours), 2500 $h^{-1}$ (27.2<t≤28.5 hours), 3000 $h^{-1}$ (28.5<t≤29.6 hours), 500 $h^{-1}$ (29.6<t≤30.7 hours), Temperature: 700° C. (0.0≤t≤3.0 hours), 800° C. (3.0<t≤5.5 hours), 900° C. (5.5<t≤30.7 hours),
Catalyst filling amount: 17.6 ml
Gas flow rate (1500 $h^{-1}$): $CH_4$=440 Nml/min, $H_2O$=1319 Nml/min
Arrangement of catalyst: the catalyst after the methanol decomposition test was randomly arranged in the reaction tube As described above, the SV and the temperature were adjusted with time.

FIG. 8 illustrates the result. FIG. 8 is a graph illustrating the result of the methane steam-reforming test using the catalyst which was used for the methanol decomposition test, and illustrating a relationship between the reaction time and the methane conversion.

It is found from FIG. 8 that the $Ni_3Si$ after the methanol decomposition test exhibits high catalyst activity to the methane steam-reforming reaction. The methane conversion of the $Ni_3Si$ was 41.8~47.4% by the reaction at 700° C., 54.1~74.5% by the reaction at 800° C., 78.8~99.3% by the reaction at 900° C. (in the case of SV=500 $h^{-1}$, and 98.3~99.3% in 10~24 hours). Compared to the result in FIG. 6, the $Ni_3Si$ after the methanol decomposition test has more enhanced methane conversion, and more excellent catalyst efficiency than the etched $Ni_3Si$.

The tests described above demonstrate that the $Ni_3Si$ cubic sample exhibits the catalyst activity to the methane steam-reforming test and the methanol decomposition test. It is also demonstrated that, when the methanol decomposition is performed to the $Ni_3Si$ cubic samples as the pretreatment, the catalyst activity of the $Ni_3Si$ cubic samples to the methane steam-reforming reaction is significantly enhanced.

(Effect demonstration experiment 2)

In the effect demonstration experiment 1, the methane steam-reforming test and the methanol decomposition test were carried out by using the cubic samples of about 5 mm as the catalyst. On the other hand, in the effect demonstration experiment 2, the methanol decomposition test was carried out by using a stacked structure of perforated disk-like members as the catalyst.

FIG. 9 is a schematic cross-sectional view illustrating a catalyst structure (reaction device) used in the effect demonstration experiment 2. FIG. 10 is a disassembled view of the stacking unit equipped in the catalyst structure, and FIG. 11 is a schematic view of plural stacked disk-like members as viewed from the stacking direction.

The catalyst structure has a structure in which plural stacking units 20 are stacked as illustrated in FIG. 9. For example, four stacking units 20 are stacked in FIG. 9. As illustrated in FIG. 10, the stacking unit 20 is configured such that plural disk-like members 15a and 15b made of $Ni_3Si$ are stacked, and the stacked disk-like members are sandwiched between a first plate member 16 and a second plate member 17. In the stacking unit 20, the first disk-like member 15a and the second disk-like member 15b, which have a different shape, are alternately stacked. The first disk-like member 15a and the second disk-like member 15b are made in a shape with a reaction gas flow channel by which a probability of a contact of a reaction gas to the surfaces of the disk-like members 15a and 15b is enhanced, as illustrated in FIGS. 9 and 11.

The method of the methanol decomposition test using the structure having the stacked disk-like members made of $Ni_3Si$ will be described below.

In the method similar to the effect demonstration experiment 1, a $Ni_3Si$ ingot having the composition in Tables 1 and 2 was prepared. The $Ni_3Si$ ingot was subjected to an electric spark forming to form a perforated disk-like member. The disk-like member has a large hole on the center, and plural small holes around the large hole as illustrated in FIGS. 9 to 11. The first disk-like member 15a and the second disk-like member 15b were prepared, wherein the positions of the small holes were different between the first disk-like member 15a and the second disk-like member 15b. The small holes were formed in such a manner that the small holes on the first disk-like member 15a and the small holes on the second disk-like member 15b were shifted when they were stacked to be adjacent to each other. FIG. 12(a) is a photograph of the prepared first disk-like member 15a, while FIG. 12(b) is a photograph of the prepared second disk-like member 15b. The prepared first disk-like member 15a and the second disk-like member 15b were etched in the same manner as in the effect demonstration experiment 1.

Then, the catalyst structure was produced by using the first and second disk-like members 15a and 15b. FIGS. 13(a) to (d) are photographs for describing the assembly process of the catalyst structure.

Firstly, the first and second disk-like members 15a and 15b were alternately stacked on the second plate member 17 by use of a bolt. Ten disk-like members in total were stacked. The first plate member 16 was stacked thereon. FIG. 13(a) illustrates this state. Then, the first and second disk-like members 15a and 15b were alternately stacked on the first plate member 16. Ten disk-like members in total were stacked. FIG. 13(c) illustrates this state. The second plate member 17 was stacked thereon, and the stacking unit was fixed by a bolt and nut. Thus, the catalyst structure illustrated in FIG. 13(d) was assembled. The catalyst structure had a diameter of 30.1 mm and a length of 10.5 mm.

Since the $Ni_3Si$ intermetallic compound was assembled as the catalyst structure described above, the geometric surface area of the catalyst per the filling volume is larger 1.5 times than that of the cubic sample catalyst, formed by processing the $Ni_3Si$ intermetallic compound into a cubic of 5 mm, in the effect demonstration experiment 1.

Two prepared catalyst structures were arranged in a quartz tube with a diameter of 41 mm and a length of 1000 mm with the Raschig ring. This quartz tube was replaced by the stainless tube having the cubic sample arranged therein in the block furnace in FIG. 5, and the methanol decomposition test was carried out. Since two catalyst structures were arranged, the capacity of the sample was 15.34 ml.

(i) Hydrogen reduction process

The reduction process was performed to the surface of the $Ni_3Si$ disk-like member 15. Specifically, a nitrogen gas was flowed into the quartz tube with a space velocity (SV) of 820/hr, and the temperature of the catalyst structure was increased to 500° C. from room temperature. The catalyst structure was held for 1 hour with 500° C. (the temperature of the lower end of the catalyst structure). Thereafter, the flowing gas was changed to 14% hydrogen gas (diluted with nitrogen gas) with the space velocity of 960/hr, and the catalyst structure was held for 1 hour at 500° C. Then, the flowing gas was changed to nitrogen gas, and the catalyst structure was held for 30 minutes. Thereafter, the hydrogen gas serving as the flowing gas was analyzed. The concentration of the hydrogen gas was 0.1% or less.

(ii) Catalyst performance test

Then, the temperature of the catalyst structure was increased to 580° C. (the temperature at the lower end of the catalyst structure) under the flow of the nitrogen gas, and thereafter, the catalyst performance test was carried out. In the catalyst performance test, methanol diluted with nitrogen gas was supplied to the catalyst structure, and the concentration of each of hydrogen gas ($H_2$), nitrogen gas ($N_2$), methane gas ($CH_4$), carbon monoxide gas (CO), and carbon dioxide gas ($CO_2$), those of which were reaction gases, was measured. The gas to be analyzed was sampled from the flow channel after an ice bath collecting methanol or the like. The composition that was not measured was specified as methanol ($CH_3OH$) etc. The catalyst performance test was carried out for 24 hours, and the gas to be analyzed was sampled every 30 minutes, every one hour, or every two hours for measuring the concentration of the gases.

The gases were supplied under the conditions indicated in Table 3 in the catalyst performance test.

Tables 4 and 5 illustrate the result of the catalyst performance test.

The methanol conversion (methanol decomposition rate) illustrated in Table 5 was calculated by converting the composition of the reaction product gases illustrated in Table 4 into the amount of the generated gases with the nitrogen gas being used as a reference.

TABLE 3

|  | Set Value | | Measured Gas Volume | |
| --- | --- | --- | --- | --- |
|  | SV 1/hr | Gas Volume ml/min | SV ml/min | Gas Volume ml/min |
| $N_2$ | 820 | 210 | 820 | 210 |
| Methanol | 1,500 | 384 | 1,460 | 373 |

TABLE 4

|  | $H_2$ % | $N_2$ % | $CH_4$ % | CO % | $CO_2$ % | $CH_3OH$ etc. % | Total % |
| --- | --- | --- | --- | --- | --- | --- | --- |
| 6 hr | 43.8 | 18.3 | 0.2 | 26.7 | 0 | 11.0 | 100 |
| 12 hr | 43.0 | 18.9 | 0.3 | 26.5 | 0 | 11.3 | 100 |
| 18 hr | 40.9 | 22.1 | 0.5 | 25.4 | 0.1 | 11.0 | 100 |
| 24 hr | 38.5 | 27.2 | 0.7 | 23.0 | 0.2 | 10.4 | 100 |

TABLE 5

|  | Supply Gas | | Reaction Product Gases | | | | | Methanol[1] |
| --- | --- | --- | --- | --- | --- | --- | --- | --- |
|  | Methanol ml/min | Nitrogen Gas ml/min | $H_2$ ml/min | $CH_4$ ml/min | CO ml/min | $CO_2$ ml/min | $CH_3OH$ etc. ml/min | Conversion % |
| 6 hr | 373 | 210 | 503 | 2 | 306 | 0 | 126 | 83 |
| 12 hr | 373 | 210 | 478 | 2 | 294 | 0 | 126 | 80 |
| 18 hr | 373 | 210 | 389 | 4 | 241 | 0.1 | 105 | 66 |
| 24 hr | 373 | 210 | 297 | 6 | 178 | 0.2 | 80 | 49 |
| Average | 373 | 210 | 417 | 4 | 255 | 0.1 | 109 | 69 |

[1]Methanol conversion was calculated from corresponding amount of CO + $CH_4$. $CH_3OH \rightarrow CO + 2H_2$ It is apparent from the result of the experiment that the $Ni_3Si$ catalyst structure has a high activity in which the methanol conversion is 83% 6 hours after the start of the reaction. In the effect demonstration experiment 2, the methanol conversion tended to reduce 12 hours after the start of the reaction. However, the $Ni_3Si$ catalyst structure exhibited the methanol conversion of 49% even after 24 hours.

(Effect demonstration experiment 3)

For comparison with the effect demonstration experiment 2, a methanol decomposition test using a cubic sample of about 5 mm as a catalyst was carried out. The cubic sample catalyst was made in the same manner as in the effect demonstration experiment 1. In the effect demonstration experiment 3, the methanol decomposition test was carried out with the method and device same as those in the effect demonstration experiment 2, except that the cubic sample catalyst was used instead of the catalyst structure.

Table 6 illustrates the methanol conversion measured in the effect demonstration experiment 2 using the catalyst structure and the methanol conversion in the effect demonstration experiment 3 using the cubic sample catalyst. They are compared 6 hours after the start of the reaction. The methanol conversion in the effect demonstration experiment 3 was 41%, while the methanol conversion in the effect demonstration experiment 2 was 83%. It is understood from this result that the catalyst structure has the activity twice as high as the activity of the cubic sample catalyst. In the effect demonstration experiment 3, the methanol conversion became the maximum, stable value at the point of around 6 hours after the start of the reaction.

On the other hand, in the effect demonstration experiment 2, the methanol conversion tended to decrease around 12 hours after the start of the reaction. However, even 24 hours after the start of the reaction, the methanol conversion of 49% higher than 41% in the effect demonstration experiment 3 was attained. The catalyst structure in the effect demonstration experiment 2 exhibited the methanol conversion of an average of 69% per 24 hours, and this is about 1.7 times better than the methanol conversion in the effect demonstration experiment 3.

TABLE 6

|  | Reaction Time (h) | | | | |
| --- | --- | --- | --- | --- | --- |
|  | 6 h | 12 h | 18 h | 24 h | Average |
| Effect Demonstration Experiment 2 (Catalyst Structure) | 83% | 80% | 66% | 49% | 69% |
| Effect Demonstration Experiment 3 (Cubic Sample Catalyst) | 41% |  |  |  | 41% |

EXPLANATION OF NUMERALS

1 Catalyst made of $Ni_3Si$-based intermetallic compound
3 Heating unit
5 Methanol supply unit
7 Steam supply unit
8 Water supply unit
9 Pump
11 Evaporator
13 Carrier gas supply unit
15, 15a, 15b Disk-like member
16 First plate member
17 Second plate member
20 Stacking unit

The invention claimed is:

1. A catalyst for producing hydrogen gas, the catalyst consisting of a $Ni_3Si$-based intermetallic compound,
wherein the $Ni_3Si$-based intermetallic compound consists of more than 0 but no greater than 100 ppm by weight of boron with respect to a total weight of Si and Ni, 23.5 to 28.0% by atom of Si, a balance made up of Ni as a major component, and inevitable impurities,
wherein the catalyst has a catalytic action to the methanol decomposition reaction or to the hydrocarbon steam-forming reaction, and
wherein the $Ni_3Si$-based intermetallic compound comprises at least a $\beta_1$ phase having an $L1_2$ crystal structure.

2. An activated catalyst for producing a hydrogen gas, wherein the catalyst of claim 1 was subjected to an activation treatment by contact with gaseous methanol.

3. A reaction device comprising a plurality of disk-like members formed of the catalyst according to claim 1, wherein
each of the disk-like members has a plurality of through-holes, and
the plurality of disk-like members is stacked so that the through-holes in the disk-like members adjacent to each other are shifted.

4. A method for producing hydrogen gas from methanol comprising the steps of:
heating the catalyst according to claim 1 to 520° C.-650° C., and
bringing a gas comprising methanol into contact with the heated catalyst.

5. A method for producing the hydrogen gas from hydrocarbon, comprising the steps of:
heating the catalyst according to claim 2 to temperatures of 700° C. or higher, and
bringing a gas comprising hydrocarbon and steam into contact with the heated catalyst.

6. A hydrogen production device comprising: the catalyst according to claim 1;
a heating unit for heating the catalyst; and
a supply portion for supplying methanol or hydrocarbon to the catalyst.

7. A hydrogen production device comprising:
the catalyst according to claim 2;
a heating unit for heating the catalyst; and
a supply portion for supplying hydrocarbon to the catalyst.

8. A method for activating a catalyst for producing a hydrogen gas from hydrocarbon, the method comprising the steps of:
producing an $Ni_3Si$-based intermetallic compound by solidifying a molten metal consisting of more than 0 but no greater than 100 ppm by weight of boron with respect to a total weight of a composition consisting of 23.5 to 28.0% by atom of Si, a balance made up of Ni as a major component, and inevitable impurities; and
activating the produced $Ni_3Si$-based intermetallic compound by bringing the $Ni_3Si$-based intermetallic compound into contact with gaseous methanol to cause a methanol decomposition reaction,
wherein the catalyst has a catalytic action to the methanol decomposition reaction or to the hydrocarbon steam-forming reaction.

9. A method for producing hydrogen gas from methanol, the method comprising the steps of:
heating the catalyst in the reaction device according to claim 5 to 520° C. -650° C., and bringing a gas comprising methanol into contact with the heated catalyst.

10. A hydrogen production device comprising:
the reaction device according to claim 3;
a heating unit for heating the catalyst; and
a supply portion for supplying methanol or hydrocarbon to the catalyst.

* * * * *